United States Patent [19]
Frederickson

[11] 3,775,610
[45] Nov. 27, 1973

[54] METHOD AND SYSTEM FOR SECONDARY EMISSION DETECTION

[75] Inventor: Arthur R. Frederickson, Stow, Mass.

[73] Assignee: The United States of America as represented by the Secretary of the Air Force, Washington, D.C.

[22] Filed: June 20, 1972

[21] Appl. No.: 264,695

[52] U.S. Cl. .......................................... 250/305
[51] Int. Cl. .......................................... H01j 37/26
[58] Field of Search.............. 250/49.5 AE, 49.5 PE

[56] References Cited
UNITED STATES PATENTS
3,646,344  2/1972  Plows ........................ 250/49.5 AE
2,950,387  8/1960  Brubaker .................... 250/41.9 TF OTHER PUBLICATIONS
"A Screened Emitter Photoelectron Analyzer," Pierce et al., Review of Scientific Instruments, Vol. 41, No. 12 Dec. 1970, pp. 1740–1742.

Primary Examiner—James W. Lawrence
Assistant Examiner—C. E. Church
Attorney—Harry A. Herbert, Jr. et al.

[57] ABSTRACT

A triode secondary emission detector using a bias ring and a hemispherical collector for determining and discriminating yields of high and low energy secondary emissions. Primary radiation from a chosen source is directed through an opening located at the center of the curved surface of an emission collector in the shape of a hemisphere and bombards a metal target located at the center of the base of the hemisphere. A metal bias ring surrounds the target but spaced therefrom while a bias voltage source connects the bias ring to the collector. Current readings are obtained with a collector ammeter and a target ammeter both of which have a return path to the primary radiation source.

4 Claims, 3 Drawing Figures

METHOD AND SYSTEM FOR SECONDARY EMISSION DETECTION

BACKGROUND OF THE INVENTION

Also, the emission of low energy secondary electrons from metals irradiated by high energy electrons can be an important effect in many devices which operate in the radiation environment. Electron multipliers, photomultipliers, electron tubes, channeltrons, scintillators, and geiger counters are devices which are directly sensitive to this effect. Displacement currents from components of electronic systems in a radiation environment could be totally controlled by secondary emission processes under certain bias and geometrical arrangements. Secondary emission may be an important cause of space charge effects in insulated devices such as field effect transistors, multicircuit chips, and capacitors.

In many cases where a material is being bombarded by particles or rays such as electrons, light, x-rays, atoms, molecules, ions, protons, neutrons or high energy radiations, it is important to know the resulting emission of secondary electrons.

In the past, secondary emission detectors have been used with hemisphere shaped collectors but these detectors used a grid which had the disadvantage that electrons would reflect from the grid and on to the target. Adding a screen grid to the hemisphere device protects against this reflection but this multi-grid detector becomes mechanically cumbersome because of the necessary insulators, mounting structures, et cetera, and also the screen reflects low energy electrons and thus affects the accuracy of the detector.

The present invention overcomes the above-mentioned disadvantages of the prior art as the electrons are not reflected back to the target and a more accurate determination of secondary emission is obtained while eliminating the cumbersome structural accessories of the multi-grid prior art devices.

SUMMARY OF THE INVENTION

The present invention is a hemispherical shaped triode secondary emission detector which measures accurately the total yield of high energy electrons, i.e., with energies over 50 eV, and the total energy of low energy secondary electrons with energies lower than 50 eV, and can measure approximately the energy spectrum of the low energy electrons. Three basic elements are used: a target, a bias ring surrounding the target, and a hemisphere shaped electron collector having a flanged base. The target, the bias ring and the flanged base are planar. A primary radiation source irradiates the target through an opening in the hemisphere and the target emits electrons whose number is counted by the collector and whose energy is determined by a retarding potential technique using voltage adjustments of the bias ring.

It is therefore an object of the invention to provide a secondary emission detector which is insensitive to emissions from the collector.

It is another object to provide a method of measuring and separating both high and low energy level secondary emissions.

It is still another object to provide a secondary emission detector which offers a highly accurate separation of high energy secondary emissions from low energy secondary emissions and where a preponderance of one level of energy of secondary emissions does not interfere with the reading of the other level.

It is yet another object to provide a secondary emission detector which allows all emitted electrons to be counted as there are no interfering structures to intercept electrons such as grids or mounting structures.

These and other objects, features and advantages will become more apparent from the following description taken in connection with the illustrated embodiment in the accompanying drawings.

DETAILED DESCRIPTION OF THE PREFERRED EMBODIMENT

Figure 1:
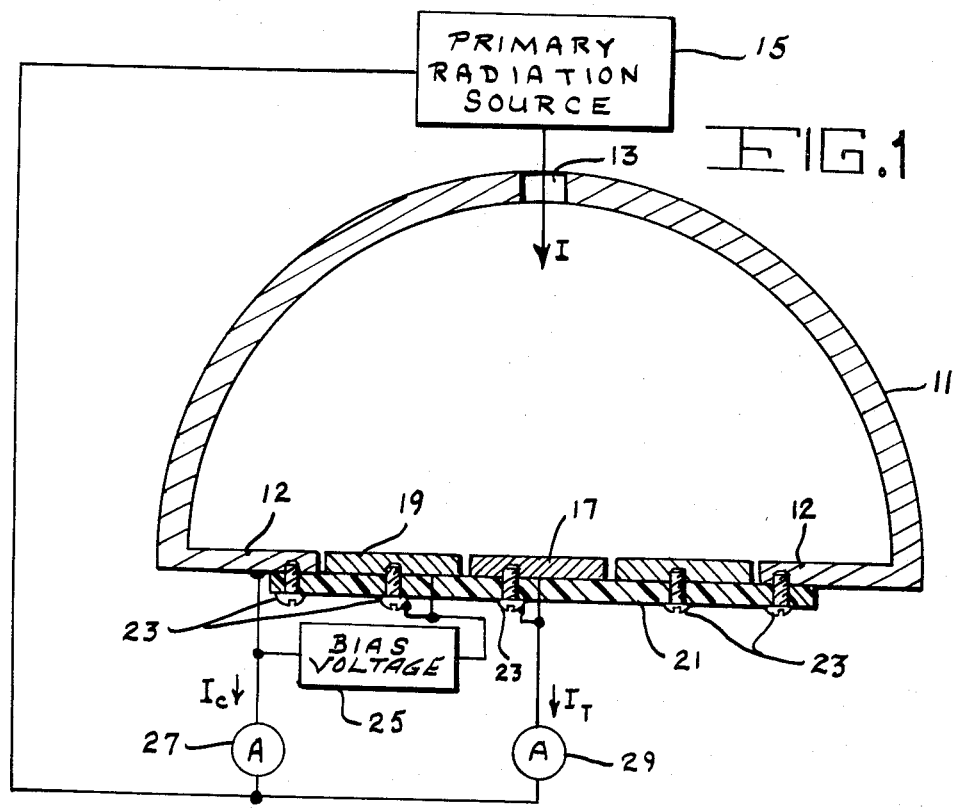
FIG. 1 is a side elevation view in cross section together with a block diagram of an embodiment of the invention.

Referring to FIG. 1, there is shown a secondary emission detector in which collector 11 has the general configuration of a hemisphere with appropriate openings and has a flanged edge 12 at the base. Opening 13 at the center of the curved surface of the hemisphere allows radiation to be directed from primary radiation source 15. This radiation source can provide either charged or uncharged primaries and can include electrons, ions, or x-rays. As an example, the source could be a Van de Graaf accelerator. The radiation is directed down through opening 13 to metal target 17 at the base of the hemisphere. If there is secondary radiation it will be collected by collector 11. Metal bias ring 19 surrounds the target at the base of the hemisphere and it is spaced between target 17 and flanged edge 12 of collector 11. Ring 19, target 17 and flange 12 of collector 11 should be planar. Target 17 and bias ring 19 could be mounted in the base of the hemisphere by insulated plate 21 fabricated of material such as nylon with metal screws 23 which also serve as electrical contacts. A voltage difference is applied between collector 11 and bias ring 19 by voltage source 25. The collector current $I_c$ is measured by ammeter 27 and the target current $I_T$ is measured by ammeter 29.

The electric current yield from the target per incident primary current $I_c$ for electrically charged primaries is given by the yield fraction $I_c/I_T+I_c$ For uncharged primaries, the number N of primaries must be known from the source which could be determined by a counter or any other well known device for determining output radiation. The number of secondaries from the target can be determined from either $I_c$ or $-I_T$. These values will be the same since for uncharged primaries no particles will be returned to the primary radiation source.

Figure 2:
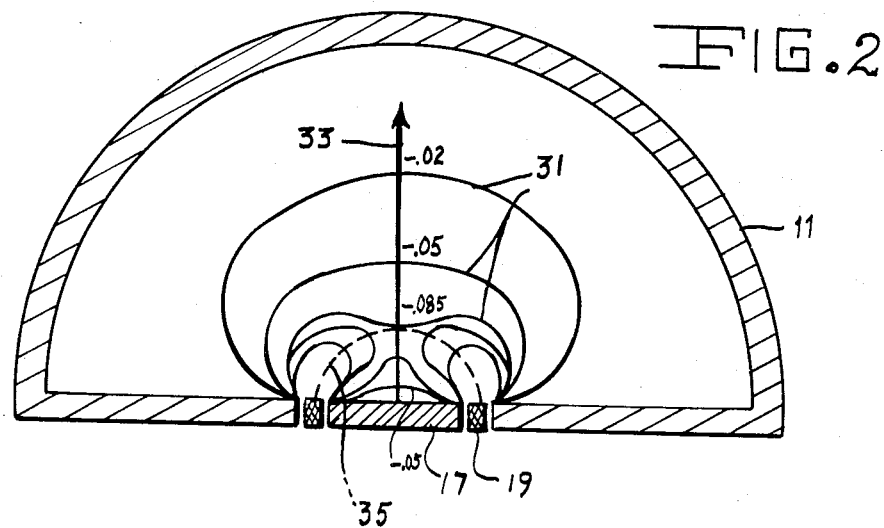
FIG. 2 is a side elevation view of the detector showing the lines of equipotential.

Referring to FIG. 2, there is shown a cross section of a triode secondary emission detector with retarding equipotential lines 31. The configuration of the triode detector is generally the shape of that shown in FIG. 1 although the dimensions of bias ring 19 and collector 11 can vary. However, flange 12 of collector 11, bias ring 19 and target 17 are still planar. The retarded potential field is determined by the target radius, the ring size, and the ring bias. For most geometries, low energy electrons are completely retarded by a −100 volt ring bias. Target 17 and collector 11 are both at zero potential. Proceeding from target 17 in the direction of arrow 33 which represents the z symmetry axis the values increase until reaching a maximum retarding potential shown by dotted line 35 and then decrease again to zero potential at collector 11. An electron emitted along the symmetry axis 35 encounters a retarding potential equal approximately to −9 percent of the ring bias. Electrons emitted in any other direction encounter a greater retarding potential. Therefore a ring bias of −100 V will stop all electrons with less than 9 eV of energy.

Figure 3:
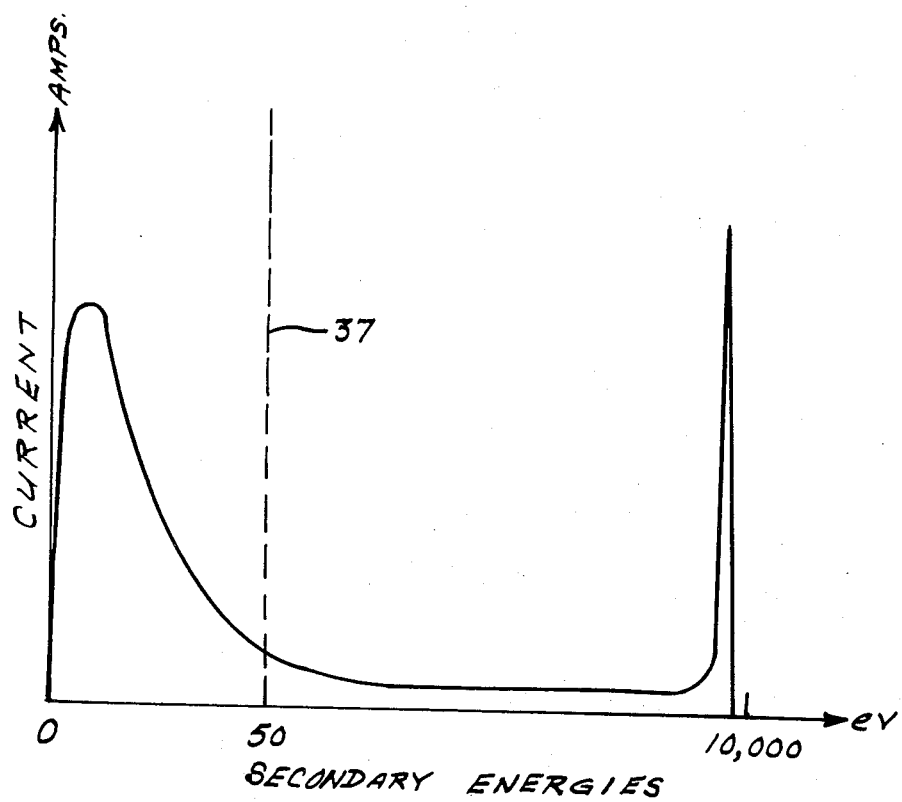
FIG. 3 is a graph showing the relationship between secondary emission current and the energies of secondary emission electrons.

Referring to FIG. 3, there is shown a graph of energy distributions of secondary electrons in which the ordinate represents the electron current at a particular energy level and the abscissa represents the energy of the electrons' potential in electron-volts. If the bias on bias ring 19 is 50 V the zero point of the graph will move over to the position shown by dotted line 37. Thus it is shown by varying the value of bias source 25 the low energy secondary electrons can be eliminated and only high energy electrons will be collected. The quantity of high energy secondary electrons can be subtracted from the quantity of total secondary electrons collected before the varying of bias to obtain the quantity of low energy secondary electrons.

What is claimed is:

1. An apparatus for determining yields of high and low energy levels of secondary emission particles comprising:

a. a primary radiation source;
   b. a target in alignment for receiving impingements of the primary radiation source, the target being an emitter of secondary particles;
   c. means for collecting the emitted secondary particles, the collecting means having a return electrical path to the primary radiation source;
   d. a metal ring surrounding and adjacent to the target and spaced therefrom, said collecting means having the shape of a hemisphere having an opening in the curved surface thereof for penetration of radiation from the primary radiation source, the base of the hemisphere, the ring and the target being in the same plane;
   e. a bias voltage source connecting the collecting means and the metal ring; and
   f. means for measuring the current of emitted secondary particles.

2. An apparatus for determining yields of secondary emission particles according to claim 1 wherein the collecting means has a flange at the base of the hemisphere.

3. An apparatus for determining yields of secondary emission particles according to claim 2 wherein the measuring means comprises a first ammeter connected to the collecting means.

4. An apparatus for determining yields of secondary emission particles according to claim 3 wherein the measuring means further comprises a second ammeter connected to the target.

* * * * *